Figure 4:
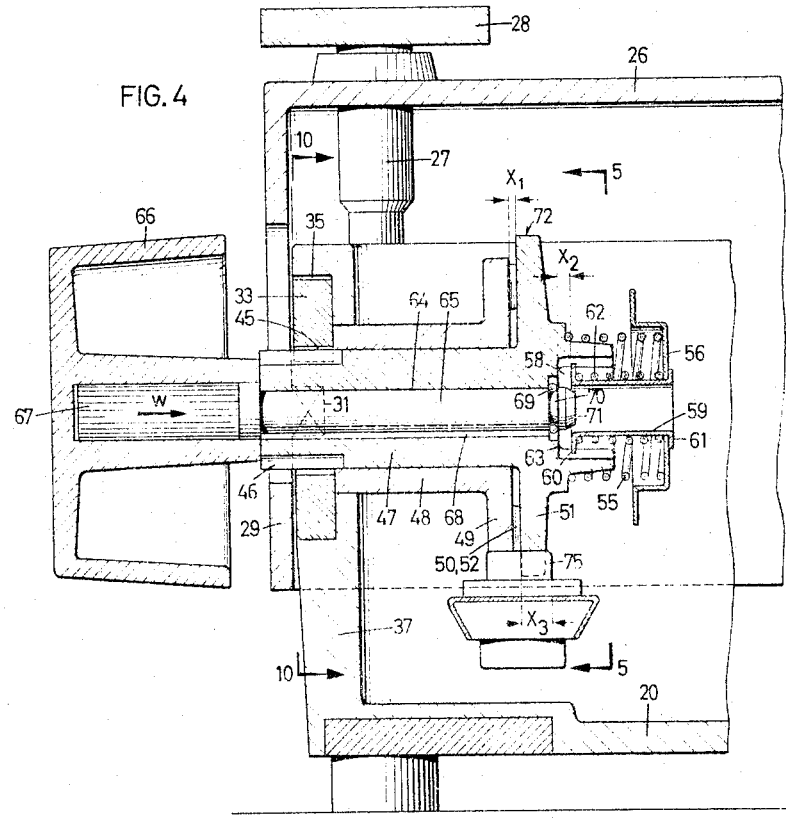

Oct. 4, 1966 E. HEER 3,276,497
SLICING MACHINE HAVING ADJUSTABLE ARTICLE SUPPORT MEANS
Filed Oct. 13, 1962 4 Sheets-Sheet 1
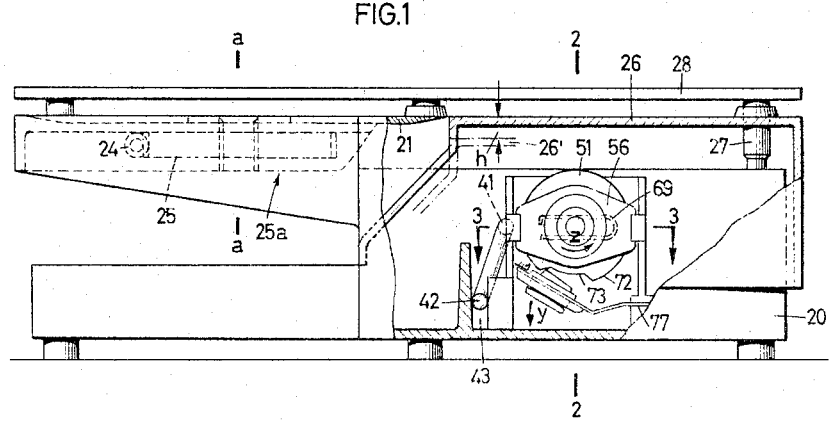
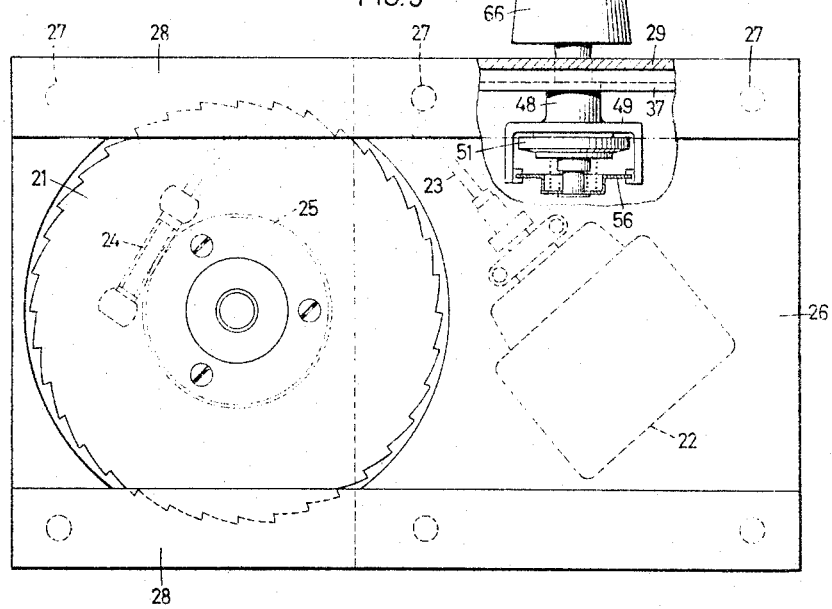
INVENTOR
Erhard Heer
BY
Michael S. Striker
ATTORNEY Oct. 4, 1966            E. HEER            3,276,497
SLICING MACHINE HAVING ADJUSTABLE ARTICLE SUPPORT MEANS
Filed Oct. 13, 1962            4 Sheets-Sheet 2
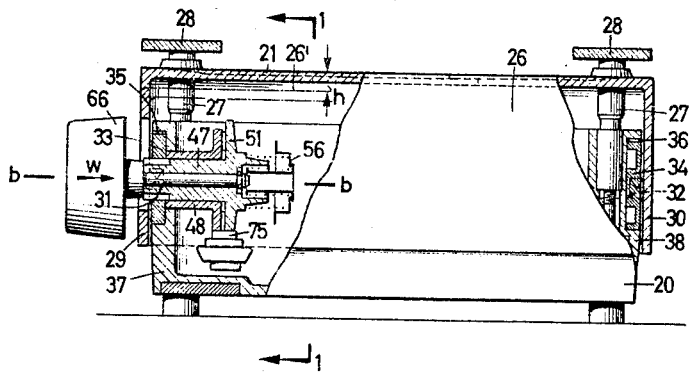
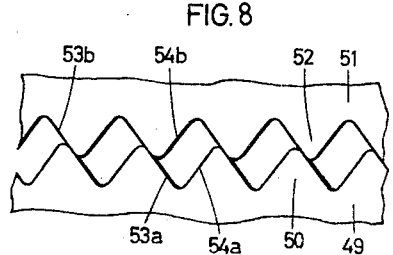
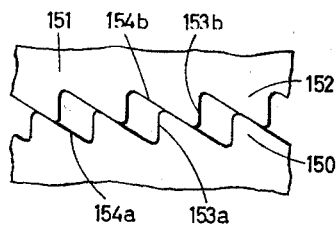
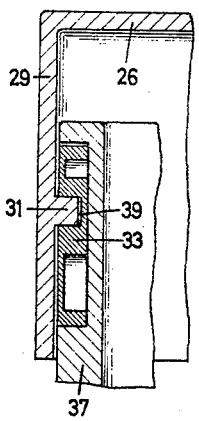
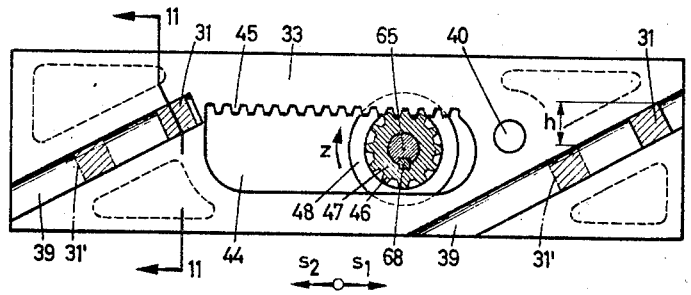
INVENTOR
*Erhard Heer*
BY
*Michael S. Striker*
ATTORNEY INVENTOR
Erhard Heer BY Michael J. Striker

ATTORNEY 3,276,497
SLICING MACHINE HAVING ADJUSTABLE
ARTICLE SUPPORT MEANS
Erhard Heer, Esslingen-Zell, Germany, assignor to Alfred
Paul KG., Esslingen-Zell am Neckar, Germany
Filed Oct. 13, 1964, Ser. No. 403,501
Claims priority, application Germany, Jan. 25, 1964,
P 33,452
13 Claims. (Cl. 146—105)

This invention concerns machines, and although not so restricted, it is particularly concerned with domestic slicing machines.

According to the present invention a machine comprises a tool or tool holder and a workpiece support, adjustment means for adjusting the relative position of the tool or tool holder and the workpiece support, switch means for switching the machine on, and a common rotary device, rotation of which actuates said adjustment means and said switch means. Thus a common rotary movement completes both operations of adjusting the relative position of tool and workpiece (e.g. adjusting the slice thickness in a slicing machine) and switching the machine on.

The common rotary device may comprise a common shaft on which there are disposed two discs or wheels, one of which cooperates with said adjustment means and the other of which cooperates with said switch means. Preferably, one of said discs or wheels is constituted by a pinion which meshes with a rack, movement of which adjusts the relative position of said tool or tool holder and the workpiece support.

The rack may form part of a slider provided with at least one slot within which at least one peg on said workpiece support is slidably disposed whereby movement of said slider in a predetermined direction moves said workpiece support relative to said tool or tool holder in a direction normal to said predetermined direction.

The machine preferably includes a rotatable cutting wheel adapted to rotate about a vertical axis, and a horizontal workpiece support table, horizontal movement of said slider causing said table to move vertically.

The other of said wheels or discs may be constituted by a cam, one part of a make-and-break switch constituting a cam follower for said cam whereby rotation of said cam makes and breaks the power supply to said machine.

Prefreably a brake is provided for said common shaft to prevent free rotation thereof. Thus a ratchet device may be attached to said common shaft to provide said brake. Preferably the ratchet is provided by a flange on said shaft having a set of angularly spaced apart teeth which mesh with a set of stationary teeth on said machine, a spring being provided to urge said sets of teeth into engagement. The slopes of the sides of the teeth may be different in the circumerfential directions whereby the resistance to rotation provided by said meshing sets of teeth is greater in one circumferential direction than in the other.

In a preferred embodiment means are provided for rendering the brake ineffective. Thus the shaft may be axially movable to disengage said sets of teeth.

Preferably axial movement of said shaft disengages the cam follower from said cam whereby the machine is automatically switched off, thus providing an emergency switching system for said machine. The shaft may be spring biased against axial movement such the initial movement of the shaft, during which said sets of teeth are disengaged, is relatively easy, and subsequent movement of the shaft, during which said cam follower is disengaged from said cam, is relatively difficult. There are preferably two springs resisting axial movement of said shaft, one spring being effective during said initial movement and both springs being effective during said subsequent movement.

A safety device may be provided by which the drive to the tool may be switched off in any relative position of tool and workpiece but which prevents the drive being reinstated until the tool and workpiece are in a predetermined relative position. Thus said cam may be recessed and be mounted on said common shaft, said switch controlling the drive to the tool, the arrangement being such that, when the switch is within said recess the drive to the tool is switched off, the cam being displaceable axially in an emergency such that the switch no longer cooperates with said cam, and the drive to the tool is again switched off, the components being returnable to the operable position with the switch and cam in cooperation only when the recess of said cam is aligned with said switch, the tool and workpiece then being in said predetermined relative position.

Preferably the common rotary device includes a control knob which is readily detachable from the common shaft. Thus a spindle may be connected to said knob and said common shaft is hollow to receive said spindle, the spindle being detachably secured within said common shaft by a spring clip.

The invention is illustrated, merely by way of example, in the accompanying drawings in which.

Figure 6:
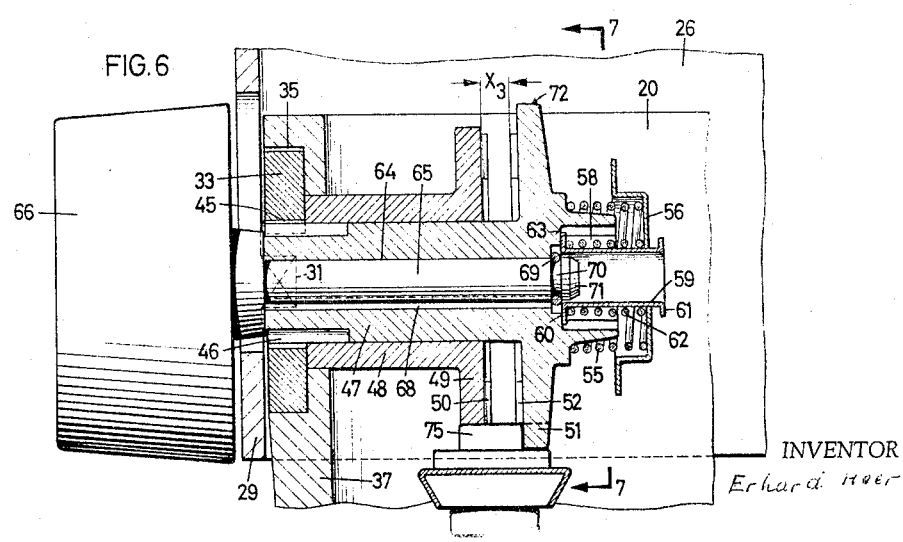
Figure 5:
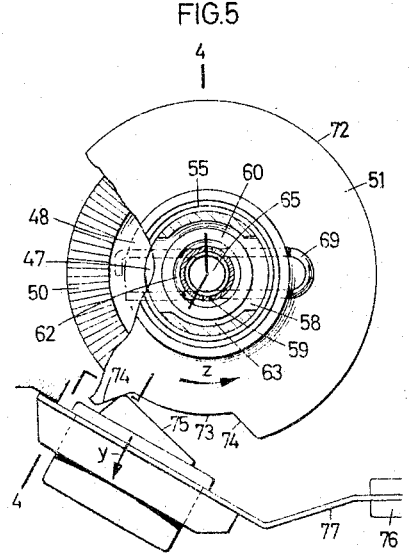
Figure 7:
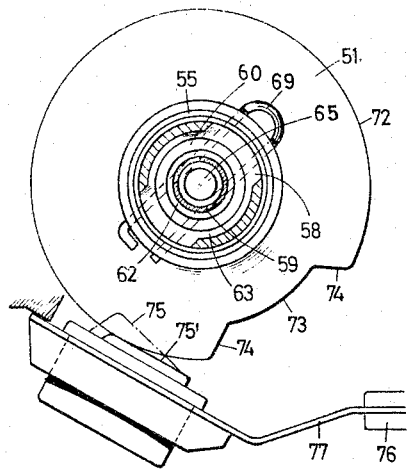

FIGURE 1 is a part sectional side elevation of a machine according to the present invention taken on the line 1—1 of FIGURE 2, FIGURE 2 is a section along line 2—2 of FIGURE 1, FIGURE 3 is a part-sectional plan view of the machine taken along line 3—3 of FIGURE 1, FIGURE 4 is a partial section of FIGURE 2 but to a larger scale, the switching device being in its neutral position, FIGURE 5 is a section along line 5—5 of FIGURE 4, FIGURE 6 is the same section as FIGURE 4 with the components in different relative positions, FIGURE 7 is a section along line 7—7 of FIGURE 6, FIGURES 8 and 9 are two versions of ratchet teeth which may be employed in the machine of FIGURES 1 to 7, FIGURE 10 is a view of a component of the machine shown in FIGURE 4 taken on line 10—10 of FIGURE 4, and FIGURE 11 is a section of the machine taken along line 11—11 of FIGURE 10.

Referring to the drawings a domestic slicing machine comprises a cutter blade 21 mounted on a vertical axis $a$—$a$ in a frame or housing 20 of the machine. The cutter blade is driven by an electric motor 22 through a flexible shaft 23, a worm 24, a worm wheel 25 and, if necessary, a reduction gear housed in the housing part 25$a$.

Mounted over the electric motor 22, but on the same side of the machine, there is a work table 26 which operates in conjunction with the rotatable blade 21. The work table is guided vertically by four out of a total of six vertical pillars 27 mounted with their bases in the housing 20. The guide pillars 27 support with their upper ends two guide rails 28 which extend for the full length of the machine, these being for guiding the product being cut (e.g. bread, sausage or the like).

The work table 26 is provided with downwardly extending side walls 29 and 30. There are mounted in each side wall two pairs of inclined square studs 31 and 32 which work in conjunction with position sliders 33 and 34. Position sliders 33 and 34 slide in horizontal grooves 35 and 36 formed in side walls 37 and 38 of the housing or frame 20. FIGURES 10 and 11 show the slider 33, in greater detail. Each of the sliders 33 and 34 has two sloping guide-slots 39 which cooperate with the square studs 31 and 32, such that when the slider is moved in the directions of the arrows $s_1$ and $s_2$ the work table 26 is raised or lowered by the square studs 31 and 32.

To ensure that both sliders 33 and 34 move together horizontally, there is provided a transverse stirrup 42 whose ends are mounted in drillings 40 in sliders 33 and 34. A lower transverse shaft portion of the stirrup 42 is disposed within a vertical slot 43 in the housing 20. Thus the transverse stirrup can oscillate about its lower transverse shaft portion and ensure that the two sldiers 33 and 34 always slide horizontally together.

Slider 33 is provided with an aperture 44 the upper edge of which is arranged as a toothed rack 45 which engages with pinion teeth 46 of a hollow shaft 47. Shaft 47 is mounted in a cylindrical bearing 48 which is firmly mounted in the side wall 37 of the housing 20, whereby the shaft 47 can rotate about the horizontal transverse axis $b$—$b$. The cylindrical bearing bush 48 can be integral with the side will 37 of the housing 20, but as shown it is made as a separate piece firmly indented or splined or welded into the side wall 37.

The bearing bush 48 supports a disc 49 which has angularly spaced apart jaw teeth 50 on its inward face (i.e. on the face directed inwardly towards the interior of the housing 20). The disc 49 cooperates with a cam disc 51 which is integral with the shaft 47 and has on its outwardly directed face angularly spaced apart jaw teeth 52 corresponding to the jaw teeth 50 and normally engaged therewith. FIGURE 8 is an enlarged view of the teeth 50, 52, when developed. It is seen that the flanks $53a$, $54a$ and $53b$, $54b$ of each row of teeth 50, 52, slope at about $45°$ to the circumferential direction.

The cam disc 51 is acted on by a spring 55 which tends to hold the teeth 50, 52, in engagement. The spring is supported at its other end against a plate 56, which is supported in a suitable way in the housing 20. A stop-tube 59 is mounted in a recess 58 in the integral shaft 47 and cam disc 51. The stop-tube 59 is provided with a flange 60 which can for example be adjustably screwed thereon. The stop tube 59 has a further flange 61 which engages behind the plate 56. A spring 62 urges the stop-tube 59 towards the cam disc 51, whereby the flange 61 is held tight up against the plate 56. The arrangement is such that the distance between the flange 60 and the stop face of the recess 58 is $x_2$ when the teeth 50, 52, are engaged. The distance $x_2$ is greater than the engagement distance $x_1$ of the teeth 50, 52.

A rotary knob 66 is located, by means of a spindle 65 to which it is attached, in a drilling 64 of the hollow shaft 47. A thicker end 67 of the spindle 65 is firmly keyed to the rotary knob 66. A longitudinal key 68 prevents the spindle 65 from turning within and relative to the shaft 47. To prevent undesired axial movement of the spindle 65 it is provided with a conical end 71 which passes through a snap-spring 69 of U-shape, as shown in FIGURE 5, whose arms snap into an annular groove 70 of the spindle 65.

The cam disc 51 has a mainly circular outer periphery 72, but a part of its periphery has a radial recess 73 which changes at sloping surfaces 74 into the circular periphery 72. A switch probe 75 forming part of a make-and-break switch engages with the cam surface 72, 73, 74. The switch probe 75 is mounted on a leaf spring 77 secured at 76 in the bottom of the housing 20.

In FIGURES 1 to 5, 10 and 11, the machine is in a zero or neutral position. In this position the work table 26 is in its highest position with its surface level with the rotating cutter 21. In this position the switch probe 75 is urged by spring 77 into engagement with the cam surface 73 of the cam disc 51, and in this position the motor 22 is switched off.

To operate the machine, the rotary knob 66 is rotated, for example in the sense of the arrow $z$ of FIGURES 5 and 10, whereby the switch probe 75 is pushed downwards by the sloping surface 74 till it begins to slide along the outer periphery 72 of the cam disc 51, whereby a contact (not shown) is closed and the electric motor 22 activated. The rotation of the pinion teeth 46 in the sense of the arrow $z$ in FIGURE 10 causes the position slider 33 to slide in the direction $s_1$. As a result the work table is allowed, by the action of the square stud 31, to move downwardly guided by the pillars 27. The work table may for example reach the position 26' shown in FIGURE 1, the square studs 31 then being in the position 31'. The switch probe 75 is now in the position 75' as shown by broken lines in FIGURE 7. Thus the distance $h$ between the cutter 21 and the table 26, which is the slicing thickness for the bread or other products needing to be sliced, can be adjusted at will by rotating the knob 66 through a suitable angle.

To switch off the drive the normal method is to turn the knob 66 back again in the direction opposite to the arrow $z$ till the switch probe 75 once more engages with the recessed cam surface 73 of the cam disc 51 and thus interrupts the supply of current to the electric motor 22.

During these rotary movements the ratchet coupling formed by meshing teeth 50, 52, is engaged under the influence of the spring 55, but the rotation causes the teeth 50, 52, to jump over each other against the influence of the spring 55, giving a ratchet action in the sense that the sloping flanks of the teeth, for example, $53a$, $53b$, slide over each other. Thus the shaft 47 and the cam disc 51 oscillate axially while rotating. This ratchet movement of the teeth 50, 52, sets up a braking resistance to the rotation and prevents the work table 26 from being pushed downwards in an undesired manner, for example when the operator is cutting bread, sausage or the like and the machine is heavily loaded.

If desired the ratchet coupling can be provided with teeth as shown in FIGURE 9. In this case the teeth 150, 152, have differently sloping flanks. Thus the flanks $153a$, $153b$, are approximately axial whereas the flanks $154a$, $154b$, slope gently. With this arrangement the cam disc 151 with the teeth 152 can be quite easily turned by hand in one direction, the flanks $154a$, $154b$, skipping over each other, oscillating axially against the influence of the spring 55, whereas on the other hand any rotation in the opposite direction is prevented by the engaging axial flanks $153a$ and $153b$.

The ratchet effect of the coupling according to FIGURE 8, or the ratchet and locking effect of the coupling according to FIGURE 9, can if desired be overcome by the operator, who merely has to push the knob 66 axially in the direction $w$, thus sliding the shaft 47 and the cam disc 51 axially inwards against the spring 55, till these parts have been moved at least through the distance $x_1$, whereby the teeth 50, 52, or 150, 152, are taken out of engagement. During this movement the switch probe 75 remains in contact with the outer periphery 72 of the cam disc 51. Once the parts have been pushed back by this amount the rotary knob 66 can be rotated without resistance against the direction of the arrow $z$. If the rotary knob 66 is now released by the operator the entire rotary member, comprising the parts 51, 47 and 66, springs axially back again under the influence of the spring 55, which brings the teeth 50, 52 or 150, 152, into engagement again. The electric motor 22 is not switched off till the cam disc has once again assumed the position of FIGURE 5, whereby the work table is lifted back again to the same height as the cutter blade 21.

A further facility, particularly with a view to possible injuries to the operator, is an emergency switch-off, or rapid switch-off arrangement. To effect this the knob 66 is pushed further along in the direction of the arrow $w$ for a distance of at least $x_3$, whereby the peripheral surface 72 of the cam disc 51 comes out of engagement axially with the switch probe 75 (FIG. 4). This stroke $x_3$ is substantially greater than the stroke $x_1$ and is somewhat greater than the stroke $x_2$. The stroke $x_2$ is enough to bring the face 63 of the shaft 47 up against the flange 60. Further movement stresses the spring 62 in addition to the spring 55. Thus the operator feels a sudden increase in the spring resistance as soon as he exceeds the stroke $x_2$. As soon as the stroke $x_3$ is exceeded the switch probe slips off the peripheral surface 72 of the cam disc 51, whereupon the switch spring pushes the probe inwards till the probe comes to rest, for example, against the peripheral surface of the stationary disc 49 (FIG. 6). In this position the probe 75 prevents the cam disc 51 from moving axially backwards in the direction opposite to the arrow $w$. When the switch probe moves inwardly in this way it switches off the drive motor 22. Now with the rotary member in a position other than the zero position the motor cannot be switched on again. In order to be able to switch the motor on again it is necessary first of all to rotate the shaft 47 and the cam disc 51, backwards again in the direction of the arrow $z$ till the zero setting is reached whereupon the cam disc 51 can be pulled back axially and the switch probe 75 once more enters the recessed cam gap 73, bringing the machine into the position of FIGURE 4.

In order to prevent unauthorised operation of the machine, the rotary knob 66 with its spindle 65 can be pulled out of the shaft 47 in the direction opposite to that of the arrow $w$, the U-shaped spring 69 snapping out of engagement with the annular groove 70. When the spindle is again inserted in shaft 47 the conical end 71 expands the spring 69, so that the control knob again snaps into place with the spring resting in the groove 70.

I claim:

1. A machine comprising a tool and a workpiece support, a rack associated with said workpiece support for adjusting the relative position of the tool and the workpiece support, switch means for switching the machine on, a single shaft, manual engagement means on one end of said single shaft for turning the latter about its axis, a disc mounted on said shaft and co-operating with said switch means and a pinion mounted on said shaft and meshing with said rack, rotation of said shaft actuating said switch means and adjusting the position of said workpiece support relative to said tool.

2. A machine comprising a tool and a workpiece support, a slider, a slot provided in said slider, a peg on said workpiece support slidably disposed in said slot whereby movement of said slider in a predetermined direction moves said workpiece support relative to said tool in a direction normal to said predetermined direction, a rack forming part of said slider, for adjusting the relative position of the tool and the workpiece support, switch means for switching the machine on, a common shaft, a disc mounted thereon and co-operating with said switch means and a pinion mounted on said shaft and meshing with said rack, rotation of said shaft actuating said switch means and adjusting the position of said workpiece support relative to said tool.

3. A machine comprising a rotatable cutting wheel adapted to rotate about a vertical axis, a horizontal workpiece support table, a slider, a slot provided in said slider, a peg on said workpiece support table slidably disposed in said slot whereby horizontal movement of said slider moves said workpiece support table vertically relative to said rotatable cutting wheel, a rack forming part of said slider, switch means for switching the machine on, a common shaft, a disc mounted thereon and co-operating with said switch means and a pinion mounted on said shaft and meshing with said rack, rotation of said shaft actuating said switch means and adjusting the position of said workpiece support relative to said rotatable cutting wheel.

4. A machine comprising a tool and a workpiece support, adjustment means for adjusting the relative position of the tool and the workpiece support, switch means for switching the machine on, a common shaft, means mounted on said shaft and co-operating with said adjustment means and switch actuating means also mounted on said shaft and co-operating with said switch means whereby rotation of said common shaft actuates said adjustment means and said switch means, and a ratchet device for preventing free rotation of said shaft, said ratchet device comprising a set of angularly spaced apart teeth connected to and arranged coaxially with said shaft, a static set of angularly spaced apart teeth on said said machine, and a spring for urging said sets of teeth into engagement.

5. A machine as claimed in claim 4 wherein the slopes of the sides of said teeth are different in the circumferential directions whereby the resistance to rotation provided by said meshing sets of teeth is larger in one circumferential direction than in the other.

6. A machine as claimed in claim 4 wherein said shaft is axially movable to disengage said sets of teeth.

7. A machine comprising a tool and a workpiece support, adjustment means for adjusting the relative position of the tool and the workpiece support, a make-and-break switch for switching the machine on, a common shaft, means mounted on the shaft and co-operating with the adjustment means, a cam mounted on the shaft and a cam follower co-operating with the cam and forming part of said make-and-break switch, rotation of said shaft actuating said adjustment means and making and breaking the power supply to the machine, said shaft being axially movable in any position of rotation thereof to disengage the cam follower from said cam whereby the machine is instantaneously switched off, thus providing an emergency switching system for said machine.

8. A machine comprising a tool and a workpiece support, adjustment means for adjusting the relative position of the tool and the workpiece support, switch means for switching the machine on, a common shaft, means mounted on said shaft and co-operating with said adjustment means, a cam mounted on said shaft and a cam follower cooperating with said cam and forming part of said switch means whereby rotation of said common shaft actuates said adjustment means and said switch means, a ratchet device for preventing free rotation of said shaft, said ratchet device comprising a set of angularly spaced apart teeth on said cam, a static set of angularly spaced apart teeth on said machine, and a spring for urging said sets of teeth into engagement, said shaft being axially movable to disengage the cam follower from said cam whereby the machine is automatically switched off, thus providing an emergency switching system for said machine, said shaft being spring biased against axial movement such that initital movement of the shaft, during which said sets of teeth are disengaged, is relatively easy, and subsequent movement of the shaft, during which said cam follower is disengaged from said cam, is relatively difficult.

9. A machine as claimed in claim 8 comprising two springs resisting axial movement of said shaft, one spring being effective during said initial movement and both springs being effective during said subsequent movement.

10. A machine comprising a tool, a drive for said tool, a workpiece support, adjustment means for adjusting the relative position of the tool and the workpiece support, a make-and-break switch for switching the drive for said tool on and off, a common shaft, means mounted on the shaft and co-operating with the adjustment means, a recessed cam mounted on the shaft and a cam follower co-operating with the cam and forming part of said make-and-break switch, rotation of said shaft actuating said adjustment means and respectively making and breaking the drive to the tool when the cam follower is respectively outside and within the recess in said cam, the cam being displaceable axially in an emergency in any position of rotation of said shaft such that the cam follower no longer co-operates with said cam, and the drive to the tool is switched off, the components being returnable to the operable position with the cam follower and cam in co-operation only when the recess of said cam is aligned with said cam follower, the tool and workpiece support then being in a predetermined relative position.

11. A machine comprising a tool holder and a workpiece support, adjustment means for adjusting the relative position of the tool holder and the workpiece support, switch means for switching the machine on, a common shaft and a pair of operating means mounted thereon and respectively co-operating with said adjustment means and switch means whereby rotation of said common shaft actuates said adjustment means and said switch means, said common shaft defining therewithin a hollow interior, a spindle disposed therewithin, a spring clip detachably securing the spindle to said common shaft and a control knob connected to said spindle and thus readily detachable from said common shaft.

12. A machine comprising a tool and a workpiece support, adjustment means for adjusting the relative position of said tool and said workpiece support, a make-and-break switch for switching the machine on and off, a common shaft, first operating means fixed to said shaft and cooperating with said adjustment means for operating the same, further operating means fixed to said shaft and co-operating with said switch for operating the same, rotation of said shaft actuating said first and said further operating means for adjusting the relative position of said tool and said workpiece support and for actuating said switch, respectively, said shaft being axially movable in any position of rotation thereof to disengage said further operating means from said switch to thereby automatically switch off the machine, and means associated with said further operating means, preventing return movement of said shaft in said axial direction until said shaft has been turned to a zero position so that the machine can be switched on again.

13. A machine as set forth in claim 12, wherein said further operating means is a cam having a peripheral cam face formed with a recess and wherein said switch has an operating portion engaging said cam face and said operating portion engaging, when said shaft is shifted in axial direction a side face of said cam preventing thereby return movement of said shaft in said axial direction until said shaft is turned to its zero position in which said operating portion of said switch is aligned with said recess.

References Cited by the Examiner
UNITED STATES PATENTS

| | | | |
|---|---|---|---|
| 2,358,223 | 9/1944 | Folk | 146—102.7 |
| 2,558,766 | 7/1951 | Lundell | 146—102.7 |
| 3,159,196 | 12/1964 | Engi | 146—102.3 |

ROBERT C. RIORDON, *Primary Examiner.*

W. GRAYDON ABERCROMBIE, *Examiner.*